United States Patent [19]

Mahlich

[11] Patent Number: 4,910,627
[45] Date of Patent: Mar. 20, 1990

[54] APPARATUS FOR PROTECTING ELECTRICALLY OPERATED DEVICES

[75] Inventor: Gotthardt C. Mahlich, Solingen, Fed. Rep. of Germany

[73] Assignee: Robert Krups Stiftung & Co. KG., Solingen, Fed. Rep. of Germany

[21] Appl. No.: 179,188

[22] Filed: Apr. 8, 1988

[30] Foreign Application Priority Data

Apr. 11, 1987 [DE] Fed. Rep. of Germany ....... 3712404

[51] Int. Cl.⁴ .............................................. H02H 3/16
[52] U.S. Cl. ......................................... 361/42; 361/49; 361/103; 307/326; 307/116; 340/650; 340/652; 200/61.08; 200/61.04
[58] Field of Search ............... 200/61.04, 61.07, 61.08, 200/61.05; 340/602, 603, 604, 605, 590, 650, 652; 307/118, 326, 116; 361/280, 286, 248, 249, 49, 42, 103; 431/358; 328/4

[56] References Cited

U.S. PATENT DOCUMENTS

| 3,847,547 | 11/1974 | Delgendre et al. | 200/61.04 X |
| 4,224,612 | 9/1980 | Macey | 200/61.08 X |
| 4,309,166 | 1/1982 | van Laarhoven | 431/358 |
| 4,365,124 | 12/1982 | Robinson | 200/81.5 |
| 4,589,047 | 5/1986 | Gaus et al. | 361/42 |
| 4,829,390 | 5/1989 | Simon | 361/49 |

*Primary Examiner*—J. R. Scott
*Attorney, Agent, or Firm*—Peter K. Kontler

[57] ABSTRACT

Apparatus for protecting electrically operated devices from damage as a result of penetration of moisture has an electric switch or a normally intact conductor, and an explosive or ignitable actuator which initiates an opening or closing of the switch or at least partial destruction of the conductor when operated by one or more sensors which detect the presence of moisture in or close to the electrically operated device. The explosive actuator can be used to clear the path for movement of a movable switch contact from open to closed position or vice versa, or to break up a conductor when ignited or otherwise operated in response to a signal from the moisture sensor or sensors. A combustible actuator can employ a flash light whose envelope confines a portion of a conductor and further contains a combustible material serving to generate heat on ignition in response to a signal from the sensor or sensors whereby the heat destroys the integrity of the portion of the conductor in the envelope.

6 Claims, 2 Drawing Sheets

APPARATUS FOR PROTECTING ELECTRICALLY OPERATED DEVICES

BACKGROUND OF THE INVENTION

The invention relates to electric appliances, electric lamps and other electrically operated (current-consuming) devices which can be found in a kitchen, in a bathroom, in a basement, in a garden and/or elsewhere to be operated by completing their electric circuits. More particularly, the invention relates to improvements in apparatus or systems for protecting electrically operated devices from damage which could develop as a result of the influence of current-conducting moisture, e.g., in response to penetration of water into an electrically operated device in a basement, cellar, bathroom, kitchen or garden.

European patent application No. 0 088 390 discloses a protecting apparatus which employs a moisture sensor serving to generate signals which are processed and utilized to prevent the development of shocks, to prevent short circuiting of an electrically operated device and/or to prevent any other damage to the device and/or injury to the person or persons nearby. The moisture detector includes a probe in the form of an open twin electric conductor which cannot be touched by a person manipulating the electrically operated device (hereinafter called consumer for short). The probe changes its electrical impedance in the presence of moisture and is connected with the input of an ignition-circuit which contains a semiconductor switch. The arrangement is such that the switch is fired (closed) when the impedance of the probe changes as a result of contact with moisture. Closing of the semiconductor switch entails the flow of electric current to initiate automatic opening of a mechanical switch in circuit with the consumer and with the energy source. The contacts of the mechanical switch are maintained in engagement with one another by a mass which is supposed to melt under the direct or indirect action of heat developing in response to closing of the semiconductor switch and the resulting flow of electric current through the conduit including the mechanical switch. In one embodiment of the just outlined apparatus, the mechanical switch is a single-pole switch which opens in response to melting of a wire. To this end, the mechanical switch comprises a base of insulating material, a rigid contact which is anchored in the base, a mobile contact which is also anchored in the base, a resilient yoke, and a so-called elastic or spiral spring. Such mechanical switches are also called spiral or elastic spring switches. A spiral switch closes in response to depression of the yoke and opens when the yoke is free to move upwardly. The forward end of the prestressed yoke is provided with an injection molded or extruded plastic anchor for a wire having a low melting point and being connected with two pins. One conductor of the circuit including the energy source and the consumer includes the pins, and the other conductor of such circuit includes the yoke and the spiral spring. The dimensions of the wire must be selected in such a way that the wire does not melt in response to the flow of rated current for the consumer, i.e., that such current can flow without melting the wire which would result in opening of the spiral spring switch.

The just described conventional apparatus exhibit the advantage that all poles of the switch are disconnected from the energy source in response to penetration of water or any other current-conducting moisture into the range of the moisture detecting probe before a person is affected by electric current, e.g., by contacting the body of water which has penetrated into the consumer. The arrangement is such that the mechanical switch irreversibly interrupts the flow of electric current between the energy source and the consumer. Consequently, a consumer which has been affected by moisture cannot be set in operation without an extensive delay. Another drawback of such apparatus is their complexity and high cost as well as that the reaction time is too long.

OBJECTS AND SUMMARY OF THE INVENTION

An object of the invention is to provide a novel and improved apparatus which can protect appliances and other current-consuming electrically operated devices in such a way that the disconnection of a consumer from the energy source takes place with a minimum of delay as soon as water or another current-conducting liquid medium penetrates into a selected portion of or sufficiently close to the electrically operated consumer.

Another object of the invention is to provide an apparatus which exhibits all advantages of heretofore known apparatus and, in addition, is simpler, less expensive and more reliable than conventional apparatus.

A further object of the invention is to provide an apparatus which can be readily connected with all kinds of existing electrically operated devices of the type found in basements, cellars, gardens, kitchens, bathrooms and at other locations where a device is likely to come in contact with water or another current-conducting liquid medium.

An additional object of the invention is to provide an apparatus which need not employ complex switches and/or other expensive parts and which can respond to penetration of moisture practically without any delay.

Still another object of the invention is to provide a novel and improved method of protecting electrically operated devices from undesirable influences of current-conducting liquids.

A further object of the invention is to provide the apparatus with novel and improved means for effecting abrupt opening of a mechanical switch or abrupt interruption of the flow of electric current through a single-line conductor.

The invention is embodied in an apparatus for protecting an electrically operated (current-consuming) device, particularly for interrupting the electrical connection between an electrically operated consumer (e.g., a lamp, a vacuum cleaner, a lantern, a toaster or the like) and a source of electrical energy in response to penetration of current-conducting moisture (e.g., water) into or close to the consumer. The apparatus comprises electric conductor means (this term is intended to embrace a printed circuit, a bus bar, a wire, a rod, a strip or a normally open or normally closed electric switch) having a current-conducting first condition and a current flow interrupting second condition (the conductor means can be connected in circuit between the source of electrical energy and the consumer), an actuator which is adjacent the conductor means and is operable to change the condition of the conductor means (e.g., to open or close a switch or to establish or destroy the integrity of a wire-like or analogous conductor), and moisture-sensitive operating means connected with the actuator and serving to operate the actuator in response to penetration of moisture into or close to the consumer. The actuator can include one or more ignitable explosive actuators. The aforementioned can include a mechanical or other switch which is in circuit with the energy source and with the consumer.

In accordance with one presently preferred embodiment, the conductor means includes a normally open electric switch (i.e., a switch which tends to assume an open position or condition), and the actuator for such switch comprises a blocking member (e.g., a pallet) movable between first and second positions in which the blocking member respectively prevents and permits opening of the switch. The actuator of such apparatus preferably further comprises means (e.g., a tension spring) for biasing the blocking member to the second position (in which the switch is free to open), and a destructible barrier in the path of movement of the blocking member from the first to the second position. The operating means of such apparatus comprises means for effecting destruction (e.g., total disintegration) of the barrier in response to penetration of moisture into or close to the consumer. The switch can comprise a first contact, a second contact which engages the first contact in the closed position of the switch, and resilient means for urging the second contact away from the first contact so that the switch can open abruptly in response to disintegration of the barrier and the resulting ability of the biasing means to propel the blocking member from the first to the second position.

The actuator can comprise an ignitable explosive actuator which is or can be directly connected to (or placed into immediate proximity of) the conductor means. The operating means of such apparatus can include means for igniting the actuator so that the latter destroys at least a portion of the conductor means. The apparatus can further comprise a preferably plate-like support for the conductor means, and a preferably plate-like closure or cover for the conductor means. The latter is located between the two plate-like parts, and the support can be provided with a socket for the explosive actuator. The cover can be provided with a hole in full or at least partial register with the explosive actuator in the socket. The actuator can be ignited via one or more leads connecting it with the sensor or sensors of moisture.

In accordance with a further presently preferred embodiment of the improved apparatus, the actuator comprises a flash lamp and the operating means comprises means for igniting the flash lamp. The lamp can comprise an envelope and a body (e.g., a mass of filamentary material or a body of gaseous or liquid fluid) of heat generating combustible material in the envelope. A portion of the conductor means is located in the envelope, and the operating means includes means for effecting combustion of combustible material in the envelope with attendant generation of heat and at least partial destruction of the portion of conductor means in the envelope. The portion of conductor means in the envelope can comprise two sections one of which is resilient and tends to move away from the other section, and a heat-destructible bond (e.g., solder) which connects the two sections to each other and enables the resilient section to move away from the other section in response to generation of heat as a result of combustion of combustible material in the envelope.

The actuator is preferably designed to abruptly change the condition of the conductor means, either from the first condition to the second condition or from the second condition to the first condition, in response to operation by the operating means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
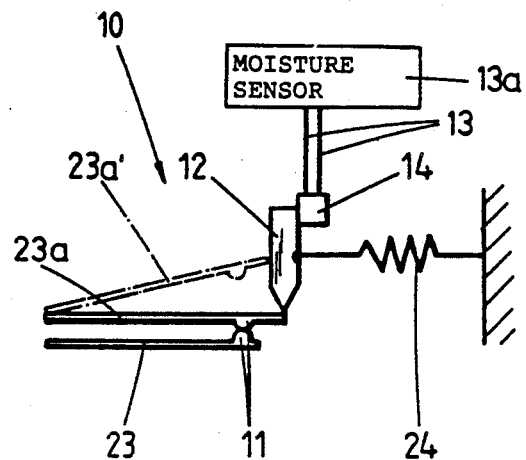
FIG. 1 is a schematic view of an apparatus which embodies one form of the invention and wherein the conductor means includes a normally open mechanical switch.

The drawing shows only those parts of the improved apparatus which are necessary for full understanding of the invention. Thus, the drawing does not show any details of electrically operated (current-consuming) devices (consumers) which are to be protected by the improved apparatus and/or the exact details of moisture-sensitive electronic or other operating means for the actuator or actuators serving to change the condition of electric conductor means between an energy source (such as the energy source 30 shown in FIGS. 4-5) and an electrically operated device (such as the device 22 shown in FIGS. 4-5). The electrically operated devices (hereinafter again called consumers for short) can include vacuum cleaners, radio receivers, television receivers, hair dryers, outdoor or indoor lamps or lanterns, electric coffee making machines, electric shavers, toasters, ovens, refrigerators, irons, alarm systems, room heaters, washers, dryers and a host of other appliances which can be set up in or moved into a garden, patio, terrace, kitchen, bathroom, basement, cellar, den and/or elsewhere in or outside of a house, apartment and/or other edifice. The moisture-sensitive operating means can include capacitive and/or otherwise operated sensors of any known design, as long as they can transmit signals in response to detection of the presence of moisture in or sufficiently close to a designated area, e.g., in the housing of an electrical appliance. Moisture detectors which can be used in the apparatus of the present invention are employed in certain types of tobacco processing machines, e.g., in machines which convey shredded tobacco to the distributor or hopper of a cigarette rod making machine. There are many other fields where moisture detectors capable of serving as a means for operating the actuators of apparatus embodying the present invention can be put to use. For example, moisture detectors are also used in many branches of the textile industry, by weather forecasters, in air conditioners as well as in connection with controlled combustion and chemical processing of substances.

Referring first to FIG. 1, there is shown a conductor means 10 which includes or constitutes a normally open mechanical switch having two contacts 11, a fixedly mounted lead 23 for the lower contact 11 and a resilient lead 23a for the upper contact 11. The lead 23a tends to move away from the solid-line position to assume the phantom-line position 23a' in which the switch 10 is open in that the upper contact 11 is remote from the lower contact 11 whereby the leads 23, 23a interrupt the flow of electric current between an energy source (such as 30 in FIG. 4) and a consumer (such as 22 in FIG. 4).

The actuator of the apparatus which is shown in FIG. 1 comprises a pallet-like blocking member 12 which is movable between the first or operative position (shown in FIG. 1) in which the member 12 prevents the lead 23a from moving to the phantom-line position 23a', and a second or inoperative position in which the tip of the blocking member 12 is remote from the path of movement of the lead 23a to the position 23a' so that the lead 23a can abruptly propel the upper contact 11 away from the lower contact 11 to thus interrupt the flow of electric current to the consumer. The blocking member 12 is permanently biased to the second position by a tension spring 24 but is normally prevented from moving away from the first position of FIG. 1 by a barrier 14 which is destructible in response to transmission of a signal from an operating device including an electronic or electrical moisture detector or sensor 13a and leads 13 connecting the detector 13a with the barrier 14. The transmission of a signal can result in the generation of a spark which entails the combustion of an explosive charge serving to disintegrate the casing of the barrier 14 so that the latter disappears or breaks up into fragments which can no longer oppose the bias of the tension spring 24. The illustrated tension spring 24 can be replaced with any other suitable biasing means which can move the blocking member 12 from the position of FIG. 1 so as to enable the lead 23a to abruptly change the condition of the switch 10, namely to open the switch and to thus interrupt the connection between the energy source and the consumer. The casing of the barrier 14 can contain a chemical substance which is ignitable in response to signals transmitted by the leads 13 when the detector 13a is contacted or approached by a current-conducting liquid, such as water. The reaction time of the apparatus of FIG. 1 is surprisingly short, normally in the range of 2–3 milliseconds.

The illustrated blocking member 12 can be replaced with differently configured blocking members or with blocking members of different consistency without departing from the spirit of the invention. Moreover, the barrier 14 can be replaced by a chemical barrier and the blocking member 12 can comprise a pawl, a piston or a hook. For example, the barrier 14 can contain a supply of entrapped gaseous or liquid medium which is liberated in response to a signal via leads 13, or a chemical substance whose composition is altered or which is consumed or released when the detector 13a detects moisture. The operative connection between the blocking member 12 and the barrier 14 can also be modified in a number of ways. For example, the barrier 14 need not be installed in the path of movement of the blocking member 12 under the action of the tension spring 24 but instead, the barrier 14 can be affixed to the left-hand side of the member 12 and to a stationary part to thus oppose the pull of the spring 24. The spring 24 can be replaced with a spring which pushes (rather than pulls) the blocking member 12 from the illustrated position.

Figure 2:
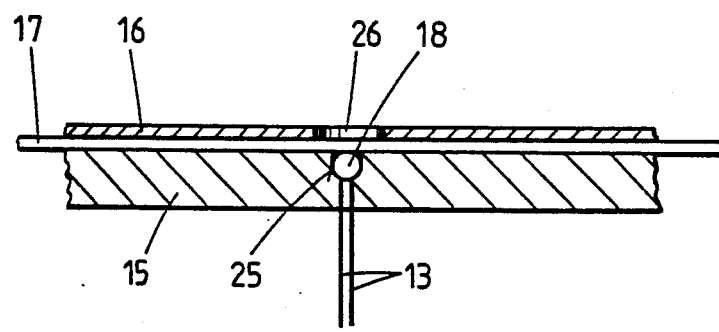
FIG. 2 is a sectional view of a second apparatus wherein an explosive actuator is used to destroy a portion of a wire-like or strip-shaped conductor which is installed between a plate-like support and a plate-like cover.
Figure 3:
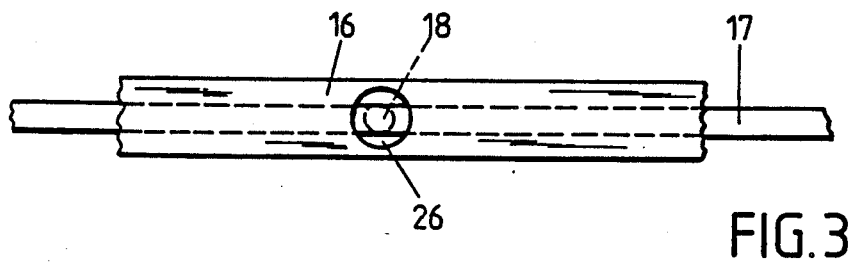
FIG. 3 is a plan view of the apparatus of FIG. 2.

FIGS. 2 and 3 show a modified apparatus wherein the conductor means 17 is a length of wire or strip material which connects the consumer with the energy source and is disposed between a plate-like support 15 and a plate-like cover or closure 16. The support 15, has a socket 25 for an ignitable explosive actuator 18, and the cover 16 has a circular opening 26 in partial or full register with the socket 25. When the leads 13 transmit a signal from the moisture detector or detectors (not shown in FIGS. 2–3), the actuator 18 destroys the integrity of the adjacent portion of the conductor means 17 so that the flow of electric current between the energy source and the consumer is interrupted. The ignitable explosive actuator 18 can be directly connected with, or can be placed into immediate or close proximity to, the adjacent portion of the conductor means 17. Destruction of a portion of the conductor means 17 in response to ignition or firing of the explosive actuator 18 (i.e., in response to transmission of an appropriate signal via leads 13) can take place as a result of heating (and melting) the conductor means 17 and/or as a result of the development of a shock wave.

The explosive actuator 18 need not have a spherical or substantially spherical shape. The shape of the socket 25 preferably conforms to or approximates that of the selected actuator 18.

Figure 4:
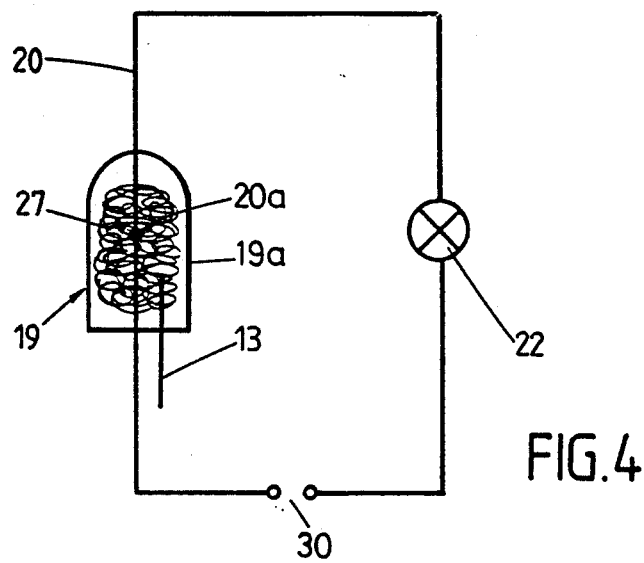
FIG. 4 is a diagrammatic view of a third apparatus wherein the actuator includes a flash lamp serving to melt a portion of a single-wire conductor between a consumer and an energy source.

FIG. 4 shows a further apparatus wherein the conductor means 20 between the energy source 30' and the consumer 22 is a wire having a low-melting-point portion 20a in the interior of an envelope 19a forming part of a flash lamp 19. The combustible material 27 in the envelope 19a can be a filamentary material, a gas or another substance which is combustible and generates heat in response to transmission of a signal from the moisture detector or detectors (not shown) by way of one or more leads 13. This causes the portion 20a to disintegrate as a result of heating and/or as a result of the development of a shock wave, so that the flow of current to the consumer 22 is interrupted practically instantaneously. The flash lamp 19 can be of conventional design, e.g., of the type used in flash units of photographic apparatus. All that is necessary is to connect a conventional flash lamp with one or more leads 13 which are further connected to one or more moisture sensors or detectors in order to transmit signals which fire the combustible material 27 in the envelope 19a (with attendant generation of heat) in immediate response to detection of moisture by the detector or detectors.

Figure 5:
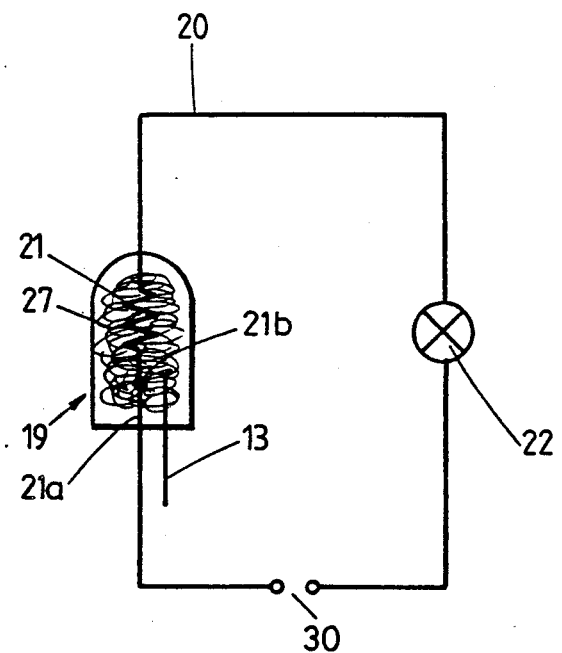
FIG. 5 is a diagrammatic view of an apparatus which constitutes a modification of the apparatus of FIG. 4.

The apparatus of FIG. 5 constitutes a modification of the apparatus which is shown in FIG. 4. The difference is that the conductor portion in the envelope of the flash lamp 19 comprises a first section 21a, a resilient second section 21 which tends to pull away from the section 21a, and a bond 21b which connects the sections 21, 21a to each other and has a low melting point so that, when the combustible material 27 in the envelope is ignited, the developing heat weakens or melts the bond 21b to thus enable the section 21 to abruptly pull away from the section 21a and to interrupt the flow of current from the source 30 to the consumer 22. The resilient section 21 ensures that the sections 21, 21a are separated by a wide gap in immediate response to melting or sufficient weakening of the bond 21b.

All embodiments of the improved apparatus exhibit the advantage that they are capable of bringing about abrupt interruption of the flow of electric current between a suitable source and one or more consumers. Moreover, each embodiment of the improved apparatus can be designed to reliably prevent arcing, e.g., by rapidly increasing the width of the gap between the contacts (11) of a switch (10) or the width of the gap between two sections or portions of another conductor (FIG. 5), or by blowing out (extinguishing) the arc.

In each of the illustrated embodiments, the actuator (such as that including the part 14, 18 or 19) is designed to change the condition of the associated conductor means (such as the mechanical switch 10 of FIG. 1, the conductor means 17 of FIGS. 2–3 or the conductor means 20 of FIGS. 4–5) in a sense to open the circuit including the consumer and the energy source. However, it is equally within the purview of the invention to reverse the function of the actuator, namely to cause the actuator to complete a circuit which, in turn, causes a switch or the like to open the circuit including the energy source and the consumer. This holds true irrespective of whether the conductor means establishes a single-pole or multipole connection between the energy source and the consumer. For example, closing of the switch 10 of FIG. 1 in response to retraction of the blocking member 12 by the spring 24 could result in activation of a control circuit (not shown) which, in turn, would interrupt the connection between the consumer 22 and the energy source 30 so as to protect the consumer and/or the person or persons touching or being close to the consumer.

Destructive barriers (14) of the type shown in FIG. 1 and explosive actuators (18) of the type shown in FIGS. 2–3 are manufactured by Dynamit Nobel of Troisdorf, German Federal Republic, and are known as "Anzuündhüutchen EL 105".

Flash lamps (19) of the type shown in FIGS. 4–5 are manufactured by Osram of Berlin, German Federal Republic, and are known as "Flip Flash" and "Magicubes X".

Moisture detectors (13a) which can be used in the apparatus of the present invention are disclosed in commonly owned European patent application No. 0 141 352.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for interrupting the connection between a consumer of electric current and a source of electrical energy in response to penetration of current-conducting moisture into or close to the consumer, comprising electric conductor means having a current-conducting first condition and a current flow interrupting second condition and including a normally open electric switch; an explosive actuator adjacent and operable to change the condition of said conductor means, said actuator comprising a blocking member movable between first and second positions in which said blocking members respectively prevents and permits opening of said switch, means for biasing said blocking member to said second position, and a destructible barrier in the path of movement of said blocking member from said first position; and moisture-sensitive operating means connected with said actuator and arranged to operate said actuator in response to penetration of moisture into or close to the consumer, said operating means including means for effecting at least partial destruction of said barrier in response to penetration of moisture into or close to the consumer.

2. The apparatus of claim 1, wherein said actuator includes an ignitable explosive actuator.

3. The apparatus of claim 1, wherein said switch comprises a first contact, a second contact which engages said first contact in the closed position of the switch, and resilient means for urging said second contact away from said first contact.

4. Apparatus for interrupting the connection between a consumer of electric current and a source of electrical energy in response to penetration of current-conducting moisture into or close to the consumer, comprising electric conductor means having a current-conducting first condition and a current flow interrupting second condition; an ignitable explosive actuator directly connected with and operable to change the condition of said conductor means; a support for said conductor means, said support having a socket for said actuator; and moisture-sensitive operating means connected with said actuator and arranged to operate said actuator in response to penetration of moisture into or close to the consumer, said operating means including means for igniting said actuator so that the latter destroys a portion at least of said conductor means.

5. The apparatus of claim 4, further comprising a cover for said conductor means, said cover having an opening in register with said actuator.

6. The apparatus of claim 5, wherein said support includes a first plate and said cover comprises a second plate, said conductor means being disposed between said plates.

* * * * *